(12) United States Patent
Mane et al.

(10) Patent No.: US 10,180,508 B1
(45) Date of Patent: Jan. 15, 2019

(54) ENHANCED NEUTRON DETECTOR AND ELECTRON AMPLIFIER STRUCTURE AND A METHOD OF FABRICATING THE ENHANCED NEUTRON DETECTOR AND ELECTRON AMPLIFIER STRUCTURE

(71) Applicant: UCHICAGO ARGONNE, LLC, Chicago, IL (US)

(72) Inventors: Anil U. Mane, Naperville, IL (US); Jeffrey W. Elam, Elmhurst, IL (US)

(73) Assignee: UChicago Argonne, LLC, Chicago, IL (US)

(*) Notice: Subject to any disclaimer, the term of this patent is extended or adjusted under 35 U.S.C. 154(b) by 0 days.

(21) Appl. No.: 15/691,652

(22) Filed: Aug. 30, 2017

(51) Int. Cl.
*G01T 1/02* (2006.01)
*G01T 3/00* (2006.01)

(52) U.S. Cl.
CPC .................................... *G01T 3/00* (2013.01)

(58) Field of Classification Search
CPC ............. G01T 1/28; G01T 3/00; H01J 43/246
See application file for complete search history.

(56) References Cited

U.S. PATENT DOCUMENTS

| 7,098,393 B2 | 8/2006 | Fleurial et al. |
| 9,177,764 B1 | 11/2015 | Baney |
| 2003/0205956 A1* | 11/2003 | Downing ............... H01J 1/32 313/104 |
| 2012/0025090 A1* | 2/2012 | Diawara .............. G01T 1/28 250/390.11 |
| 2012/0273689 A1* | 11/2012 | Sullivan ............ H01J 43/246 250/390.01 |

FOREIGN PATENT DOCUMENTS

FR         2053599 A5 * 4/1971    ............... G01T 3/00

OTHER PUBLICATIONS

D.W. MacArthur, "A neutron detector based on microchannel plates," Jun. 1987, Los Alamos National Laboratory, pp. 1-6.*
Duanmu, Q., et al., "Effects of Ion Barrier Film on Image Noise in Generation III Image Tube," International Conference on Optoelectronics and Microelectronics, Aug. 23-25, 2012, pp. 549-552.
Jiang, D., et al., "Electron transmittance characteristics of MCP ion barrier film," Proceedings of SPIE, vol. 5633, Advanced Materials and Devices for Sensing and Imaging II, Jan. 20, 2005, pp. 443-446.
Zhang, N., et al., "The Research on Preparation Process Optimization of Ion Barrier Film on the Input Side of MCP," Key Engineering Materials, vol. 552, May 27, 2013, pp. 186-192.

* cited by examiner

Primary Examiner — Kiho Kim
(74) Attorney, Agent, or Firm — Foley & Lardner LLP (57) ABSTRACT

An enhanced electron amplifier structure includes a substrate configured to amplify a signal of an incident particle by causing a cascade of secondary electron emissions and an enhancement layer configured to increase a sensitivity of the substrate to the incident particle. The enhancement layer is provided on an upper surface of the substrate.

16 Claims, 7 Drawing Sheets

FIG. 9 ations.

ENHANCED NEUTRON DETECTOR AND ELECTRON AMPLIFIER STRUCTURE AND A METHOD OF FABRICATING THE ENHANCED NEUTRON DETECTOR AND ELECTRON AMPLIFIER STRUCTURE

STATEMENT OF GOVERNMENT INTEREST

The United States Government claims certain rights in this invention pursuant to Contract No. DE-AC02-06CH11357 between the U.S. Department of Energy and UChicago Argonne, LLC, as operator of Argonne National Laboratories.

FIELD OF THE INVENTION

The present invention relates generally to the field of fabricating neutron detectors with enhanced electron amplifier structures. More specifically, the present invention relates to forming a neutron sensitive layer on an upper surface of an electron amplifier structure to increase a sensitivity of the electron amplifier structure to incident neutrons.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

An electron amplifier structure or an electron multiplier may be used as a component in a detector system to detect low levels of electrons, ions, or photons, and provide an amplified response via a plurality of secondary electron emissions. Examples of electron amplifier structures include a channeltron (single channel tube) and a microchannel plate (MCP).

An MCP is comprised of an array of narrow pores in a flat plate that permeate from the front surface of the plate to the back surface of the plate. For example, the MCP may be a two dimensional array comprised of millions of 5-20 μm diameter pores. A high voltage is applied across the plate such that the back surface is typically at 1000 V higher potential than the front surface. An electron enters the front of an MCP into a channel, and impinges on the channel wall causing secondary electron emissions to be produced by an emissive layer on the channel surface. These secondary electrons are accelerated towards the back of the plate by the high voltage bias and impact on the channel wall to produce additional secondary electrons resulting in a cascading increase in electrons along the length of the MCP channel that exit the opposite end of the channel. Since the MCP pores operate independently, a spatial pattern of electrons incident on the front surface will be preserved so that the back surface emits the same pattern but greatly amplified. In this way, the MCP may be used in imaging applications. Two or more MCPs may be placed in series to provide multiple stages of amplification. Various detectors may be located downstream of the MCP to detect and record the exiting electrons. A photocathode located upstream of the MCP can be used to convert photons incident on the front surface of the photocathode into electrons which exit the back surface and impinge on the MCP to yield a photodetector. MCP-based photodetectors can provide excellent temporal and spatial resolution, very high gain, and significantly low background signal with usability inside magnetic fields as well as cryogenic temperatures with extended life time.

Electron amplifier structures, in particular, MCP detectors have numerous applications, including use in night vision technology, medical imaging devices, homeland security, and particle detectors for use in laboratories and high-energy physics or nuclear physics installations. Neutron detection is the effective detection of neutrons entering in a well-positioned detector. Most neutron detection techniques rely on the detection of the energetic particles and photons emitted upon the absorption of neutrons by these nuclides. Existing neutron detection techniques include solid state converter films and gas-filled converters, which upon neutron absorption emit photons or charged particles that are subsequently detected by a readout device, such as charge coupled devices (CCDs); foil activation followed by the post processing readout with imaging plates; scintillating fibers or plates; and superheated liquid detectors. The currently most favored neutron detectors are based on pressurized gaseous (such as $^3$He, LiF or $BF_3$) in tubes. Higher detection efficiency can always be achieved with enlarged detection volume, for example, larger $^3$He or $BF_3$ counter and thicker lithium glass. But larger volumes degrade spatial resolution caused by possibly longer ionization tracks or scattering related photon distribution. A compromise between high efficiency and fine spatial resolution must be reached. Such large volume detectors are very expensive and of limited supply for widespread application due partly to the world-wide shortage of $^3$He. To acquire fine spatial resolution, the capability of localizing charged particle within a short range is necessary. Gas is excluded due to its poor stopping power for energetic charged particles and solid or liquid material is the better choice. Furthermore, pressurized gas systems may present an explosion hazard unacceptable in certain transport situations.

The compact geometry of MCP channels is an ideal structure for fine spatial resolution. realization. Thermal neutron detectors using MCPs exist, but they do not provide the desired neutron detection efficiency or gamma rejection over large areas. Consequently, these devices could never be scaled to the sizes and quantities needed for applications such as homeland security and treaty verification. Since traditional MCPs have been manufactured with lead glass and are expensive, many neutron detectors use MCPs in photodetectors to detect the light from a neutron-sensitive scintillator and do not capitalize on the cost and efficiency advantages of neutron-$^{10}$B interactions in the MCP bulk glass material. Neutron detection in the bulk material of MCPs has been demonstrated in small (40 mm diameter) detectors by NOVA Scientific, which manufactures and sells small pore $^{10}$B- and Gadolinium-doped neutron-absorbing MCPs incorporated in sealed devices. NOVA Scientific has successfully doped $^{10}$B and 157Gd into MCP glass. However, doping concentration conversion material is limited by the production process of MCP glass, which leads to the low density of neutron sensitive nuclides that hinders the improvement of detection efficiency. However, these types of specialized Gd incorporated MCPs are very expensive and may also have limited supply. Furthermore, large area Gd incorporated MCPs suitable for very compact neutron detectors have not yet demonstrated and will be extremely expensive to scale-up to large areas with conventional manufacturing and packaging techniques. In addition the detection of various type neutrons such as cold, thermal, fast, epithermal and relativistic need a different type of neutron sensitive element incorporation in to the MCP glass which is not straightforward and may be very expensive.

A need exists for improved technology, including a fabrication method for electron amplifier structures or devices that improve detection efficiency, enhance device gain, or prolong an operating life of the device.

SUMMARY

In some embodiments, an enhanced electron amplifier structure includes a neutron sensitive layer having predetermined neutron sensitivity and a substrate. The neutron sensitive layer is configured to interact with incident neutrons and subsequently, eject electrons due to the interaction. The substrate is configured to amplify a signal of the ejected electrons by causing a cascade of secondary electron emissions. The neutron sensitive layer is provided on an upper surface of the substrate and increases a sensitivity of the enhanced electron amplifier structure to the incident neutrons.

In other embodiments, a neutron detection system includes an enhanced electron amplifier structure and a detector. The enhanced electron amplifier structure includes a neutron sensitive layer having predetermined neutron sensitivity and a substrate. The neutron sensitive layer is configured to interact with incident neutrons and subsequently, eject electrons due to the interaction. The substrate is configured to amplify a signal of the ejected electrons by causing a cascade of secondary electron emissions. The neutron sensitive layer is provided on an upper surface of the substrate and increases a sensitivity of the enhanced electron amplifier structure to the incident neutrons. The detector is configured to detect and count a number of the secondary electron emissions emitted by the substrate of the enhanced electron amplifier structure.

In additional embodiments, a method of fabricating an enhanced electron amplifier structure includes forming a neutron sensitive layer on an etchable substrate, the neutron sensitive layer having a predetermined thickness and a predetermined neutron sensitivity, wherein the neutron sensitive layer is configured to interact with incident neutrons and subsequently, eject electrons due to the interaction; lifting the neutron sensitive layer from the etchable substrate; providing a substrate configured to amplify a signal of the electrons ejected by the neutron sensitive layer by causing a cascade of secondary electron emissions; and transferring the neutron sensitive layer onto an upper surface of the substrate.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
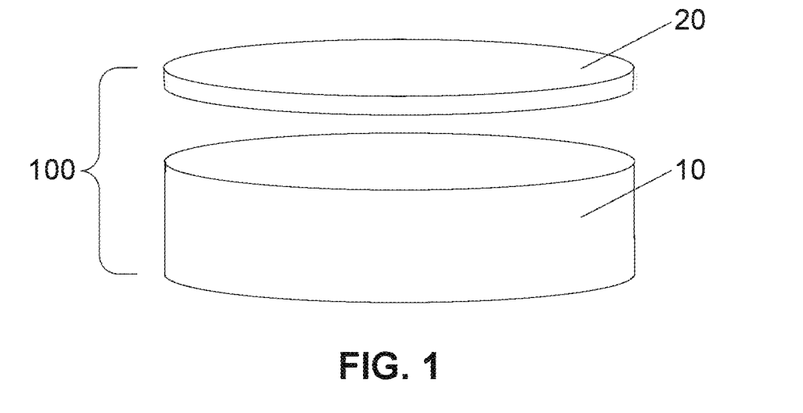
FIG. 1 illustrates an exploded view of an enhanced electron amplifier structure including a neutron sensitive layer.
Figure 2:
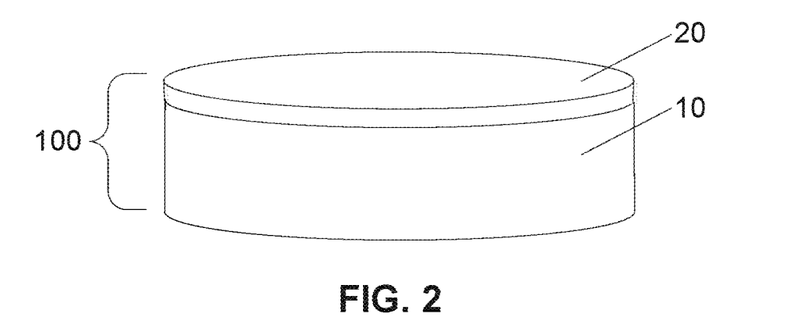
FIG. 2 illustrates the assembled enhanced electron amplifier structure of FIG. 1.

Referring, in general, to the figures, an enhanced electron amplifier structure 100, a neutron detection system 1000 including the enhanced electron amplifier structure 100, and a method of fabricating the enhanced electron amplifier structure 100 are described. Referring to FIGS. 1 and 2, the enhanced electron amplifier structure 100 includes a substrate 10 and a neutron sensitive layer 20 provided on a surface of the substrate 10. Incident neutrons interact with the neutron sensitive layer 20, which ejects electrons that are subsequently enhanced or amplified by the substrate 10. When a neutron hits the neutron sensitive layer 20, which includes at least one neutron sensitive element, the neutron interacts with the neutron sensitive element to release or emit an electron. In some implementations, the neutron sensitive layer 20 may also function as a secondary electron emission (SEE) layer that emits secondary electrons after interacting with an electron. For example, a neutron sensitive layer 20 made of $^{10}B$-doped $Al_2O_3$ may function as both a neutron sensitive layer and a SEE layer in that an incident neutron interacts with $^{10}B$, resulting in an electron emission, and the $Al_2O_3$ surface interacts with an incident electron, resulting in secondary electron emission(s). The ability of the neutron sensitive layer 20 to function as both a neutron sensitive layer and a SEE layer depends on the SEE coefficient ($\delta$), which is the ratio of the number of secondary electrons emitted to the number of primary incident electrons. In the example above, $Al_2O_3$ has a SEE coefficient $\delta=2.5$ to 3 for ALD $Al_2O_3$ 2-20 nm films. The substrate 10 is configured to amplify a signal of the electrons ejected by the neutron sensitive layer 20 by causing a cascade of secondary electron emissions (see FIG. 3). The neutron sensitive layer 20 is configured to increase a sensitivity of the neutron detection system 1000 to the incident neutrons.

Figure 3:
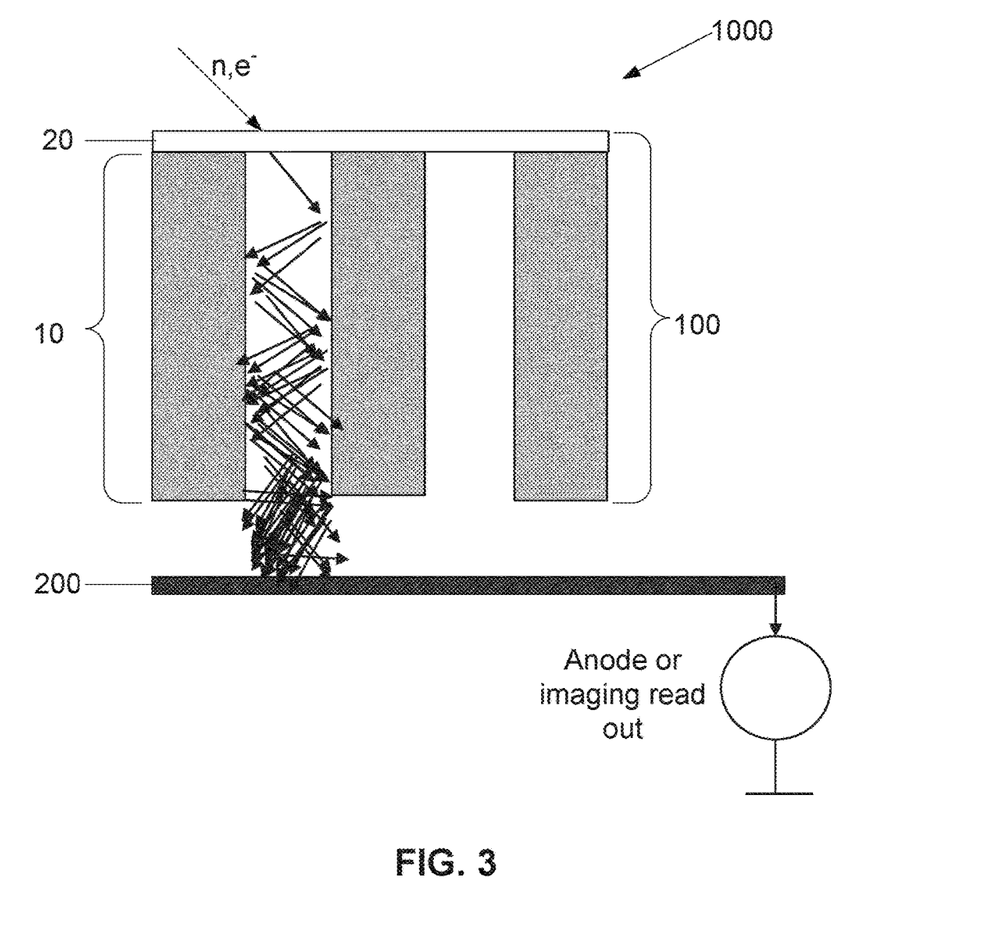
FIG. 3 illustrates a detection system that includes the enhanced electron amplifier structure of FIG. 2 and a detector.

Referring to FIG. 3, the neutron detection system 1000 includes the enhanced electron amplifier structure 100 and a detector 200 provided downstream of the enhanced electron amplifier structure 100 that is configured to detect and count a number of secondary electrons emitted by the enhanced electron amplifier structure 100. The solid line arrows in FIG. 3 illustrate the trajectory of secondary electrons in the electron amplifier structure. The broken line arrow in FIG. 3 illustrates a primary neutron or electron that strikes the neutron sensitive layer 20 of the enhanced electron amplifier structure 100. The detector 200 may output the number of counts as an anode or imaging output.

Figure 4:
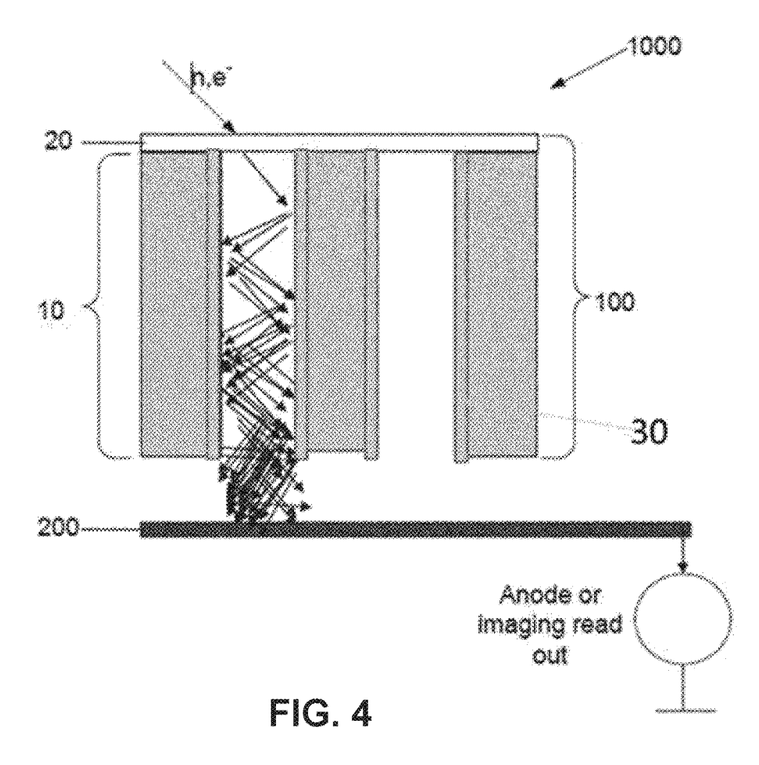
FIG. 4 illustrates the detection system of FIG. 3 with an enhancement layer provided on a surface defining a channel in the enhanced electron amplifier structure.

Referring to FIG. 4, in some implementations, the neutron detection system 1000 may further include an emissive coating 30 provided on at least a portion of a surface defining a channel in the enhanced electron amplifier structure 100. In some implementations, the emissive coating 30 covers an entirety of the surface defining the channel. The emissive coating 30 is a SEE layer configured to produce a secondary electron emission responsive to an interaction with an electron received by the channel. The emissive coating 30 may comprise various components, including various metal oxides, nitrides and sulfides, to obtain an amplified secondary electron emission in response to a low-level input. The secondary electron emission is detected downstream from the enhanced electron amplifier structure 100. The emissive coating 30 may be formed by ALD or CVD. In one embodiment, the emissive coating 30 comprises $Al_2O_3$. In various embodiments, multiple emissive coating 30 may be deposited within the channel.

In some implementations, the emissive coating 30 may function as both a neutron sensitive layer and a SEE layer. In these implementations, the emissive coating 30 includes a neutron sensitive element such as B, Li, Ga, Sm, Hf, Ta, Cd, Pb, or the like.

The method of fabricating the enhanced electron amplifier structure 100 includes a step of providing the substrate 10 and a step of forming neutron sensitive layer 20. An example of a method of fabricating the enhanced electron amplifier structure 100 is described in FIG. 5.

Figure 5:
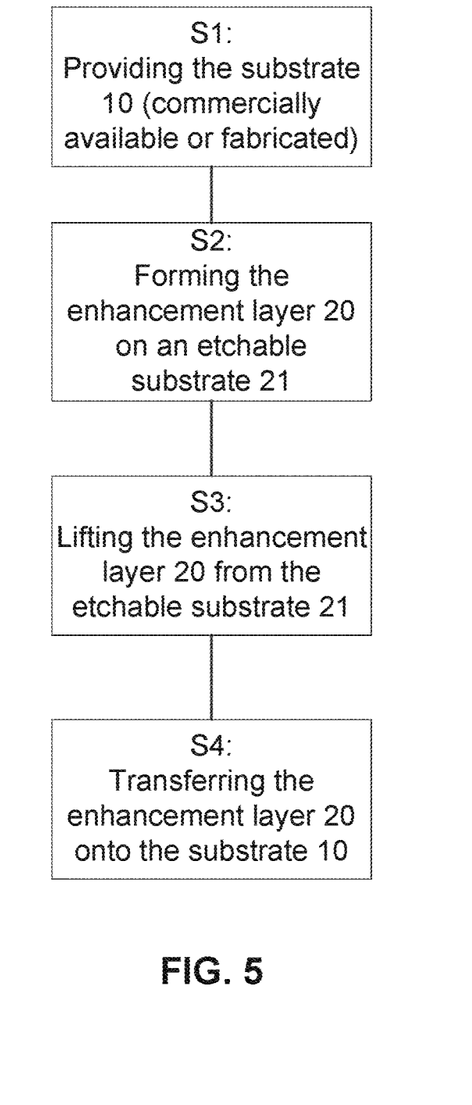
FIG. 5 is a flowchart illustrating a method of fabricating the enhanced electron amplifier structure of FIG. 2.

Referring to FIG. 5, a method of fabricating the enhanced electron amplifier structure 100 includes a first step S1 of providing the substrate 10. The substrate 10 is an electron amplifier structure. The substrate 10 may be, for example, a commercially available microchannel substrate such as active microchannel plates (MCPs), structurally fabricated micro-channels MEMS devices, microsphere plate, anodic aluminum oxide (AAO) membranes, microfiber plates (MFP), thin film functionalized MCPs, large area integrated neutron structure, or any other alternative porous membrane substrates with the electron amplification capability. Alternatively, the substrate 10 may be fabricated, for example, according to the methods described in U.S. Pat. No. 8,969, 823 and U.S. Pat. No. 8,921,799, the entire contents of which are hereby by reference in their entireties for their disclosures related to fabricating a substrate (such as a MCP detector) having a tunable resistive coating.

In one example, the substrate 10 is a MCP having tunable resistivity. The substrate 10 may be manufactured using the following steps: 1) providing a microchannel plate substrate, the microchannel plate substrate having a front surface and a rear surface and a plurality of channels extending through the substrate between the front surface and the rear surface; 2) coating the surfaces of the plurality of channels within the microchannel substrate with a resistive coating comprising a predetermined ratio of an insulating component and a conductive component composed of at least one of a metal, a metal nitride, and a metal sulfide; and 3) forming an emissive coating over the resistive coating, the emissive coating adapted to produce a secondary electron emission responsive to an interaction with a particle received by one of the plurality of channels. In other implementations, the emissive coating may be formed directly on the surfaces of the plurality of channels within the microchannel substrate (i.e., the resistive coating may be omitted). The resistivity of the microchannel plate detector is definable by establishing the ratio of the insulating component and the conductive component of the resistive coating. The conductive component may be selected from Mo, Ta, Ti, W and the nitrides thereof. The resistive coating may be prepared by atomic layer deposition (ALD) using the following steps: forming the insulating component by performing a first predetermined number of ALD cycles of alternating exposures of the microchannel plate substrate to a first metal precursor and an oxidizing reactant to form an insulating component layer composed of a metal oxide layer; and forming the conductive component by performing a second predetermined number of ALD cycles of alternating exposures of the microchannel plate substrate to a second metal precursor and an additional reactant to form a conductive component layer composed of one of a metal layer, a metal nitride layer, and a metal sulfide layer. The resistivity of the microchannel plate detector is substantially defined by the ratio of the second predetermined number of ALD cycles to the first predetermined number of ALD cycles.

In another example, the substrate 10 includes large borosilicate glass micro capillary array (MCA) plates. The MCA plates may be functionalized with ALD to include at least one resistive layer. This will allow for the generation of a uniform electrostatic field along the MCA pores. Application of the resistive layer may be followed by the application of a thin layer having a predetermined secondary electron emission (SEE) coefficient with ALD. The resultant substrate 10 is a large area electron amplifying MCP that exhibits high gain ($>10^6$), high spatial resolution (100 microns), long life, and very low background noise.

Figure 6:
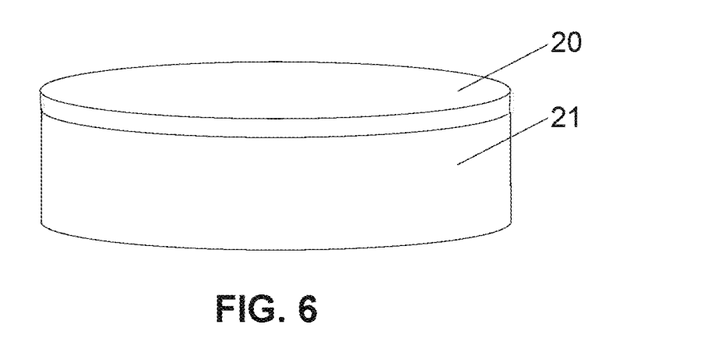
FIG. 6 illustrates a step of forming the neutron sensitive layer on an etchable substrate, which corresponds to Step 2 in the flowchart of FIG. 5.

The method of fabricating the enhanced electron amplifier structure 100 includes a second step S2 of forming the neutron sensitive layer 20. The neutron sensitive layer 20 can also be referred to as a membrane. The composition of the neutron sensitive layer 20 varies depending on the type of substrate 10 that is used. The neutron sensitive layer 20 may be formed, for example, using chemical based thin film growth methods such as ALD, CVD, VPE, Sol gel, spray pyrolysis, etc., as well as physical vapor deposition (PVD) methods such as thermal evaporation MBE, sputtering, 3D printing, etc. The neutron sensitive layer 20 may be formed on a planar or structured/micro patterned etchable substrate 21 such as a wafer, a sacrificial etch layer, or a sacrificial etch layer formed on a wafer (see FIG. 6). The neutron sensitive layer 20 is formed in a predetermined thickness. The neutron interaction sensitivity varies with percentage of neutron sensitive materials contained in the neutron sensitive layer 20. Therefore, the thickness of the neutron sensitive layer 20 varies based on the application and composition of the neutron sensitive layer 20, but is generally from 100 nm to 100s of microns. Forming the neutron sensitive layer 20 in such a manner allows for precise thickness and composition control over a large area (i.e., an electron amplifier structure).

Figure 9:
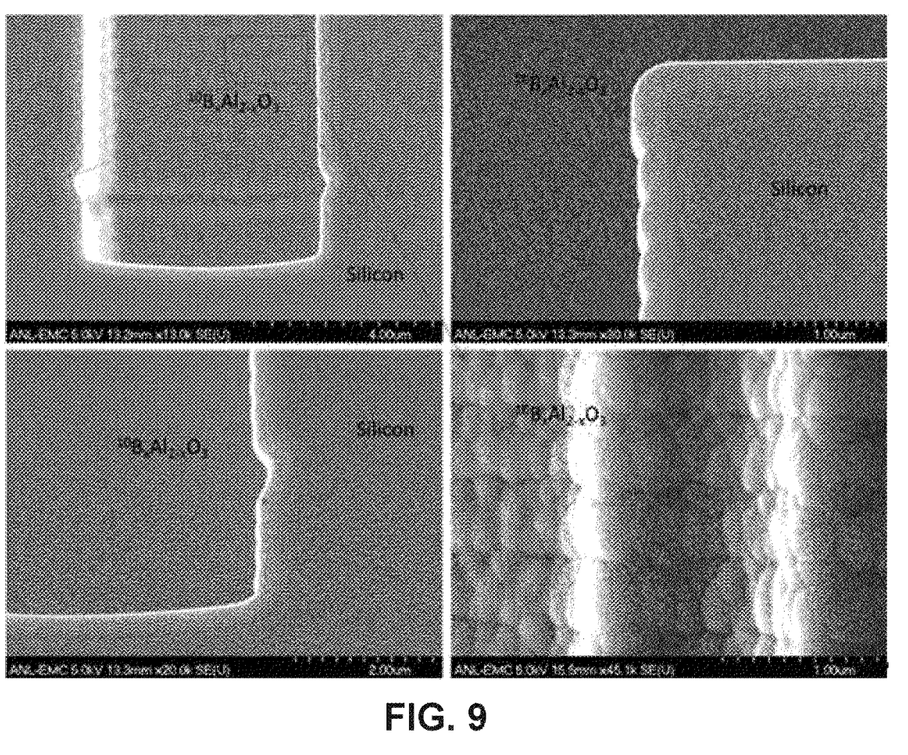
FIG. 9 illustrates an approximately 0.5 micron thick neutron sensitive layer provided on a Si substrate (i.e., an etchable substrate).

FIG. 9 illustrates an approximately 0.5 micron thick neutron sensitive layer provided on a Si substrate (i.e., an etchable substrate). The Si can be etched away, for example, with potassium hydroxide or tetramethylammonium hydroxide (TMAH).

The neutron sensitive layer 20 has predetermined neutron sensitivity. The neutron sensitive layer 20 may be composed, for example, of B, Li, Ga, Sm, Hf, Ta, Cd, Pb and/or composites or alloys thereof such as $B_2O_3$, LiF, $Gd_2O_3$, $Gd_xAl_{2-x}O_3$, $Gd_xMg_{1-x}O_y$, $B_xAl_{2-x}O_3$, $Sn_2O_3$, $HfO_2$, $Ta_2O_5$, BN, BC, $Li_3N$. In other examples, the neutron sensitive layer 20 may be composed of $Al_2O_3$ doped with B, Li, Ga, Sm, Hf, Ta, Cd, Pb, or the like. The neutron sensitive layer 20 may be formed, for example, using chemical based thin film growth methods such as ALD, CVD, VPE, Sol gel, spray pyrolysis, etc., as well as physical vapor deposition (PVD) methods such as thermal evaporation MBE, sputtering, 3D printing, etc. The neutron sensitive layer 20 may be formed by deposition on a planar or structured/micro patterned etchable substrate 21. The etchable substrate 21 may be an intermediate sacrificial etch layer (e.g., $Al_2O_3$, MgO, $SiO_2$, CuO, $TiO_2$), a substrate with native oxide, or a clean scrapeable polymer such as PET, PMMA, PS, or the like that will be etched away when the neutron sensitive layer 20 is deposited on the substrate 10. In one example, the neutron sensitive layer 20 is a $Ga_2O_3$ layer that is deposited on an etchable substrate 21 such as a copper foil with native CuO layer, or CuO deposited on a Si wafer. The sacrificial etch layer may be selected according to the composition of the neutron sensitive layer 20 and the predetermined etch selectivity.

Figure 7:
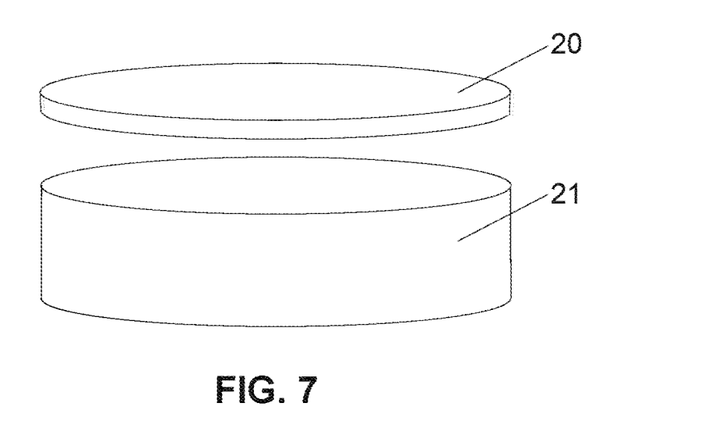
FIG. 7 illustrates a step of forming lifting the neutron sensitive layer from etchable substrate, which corresponds to Step 3 in the flowchart of FIG. 5.
Figure 8:
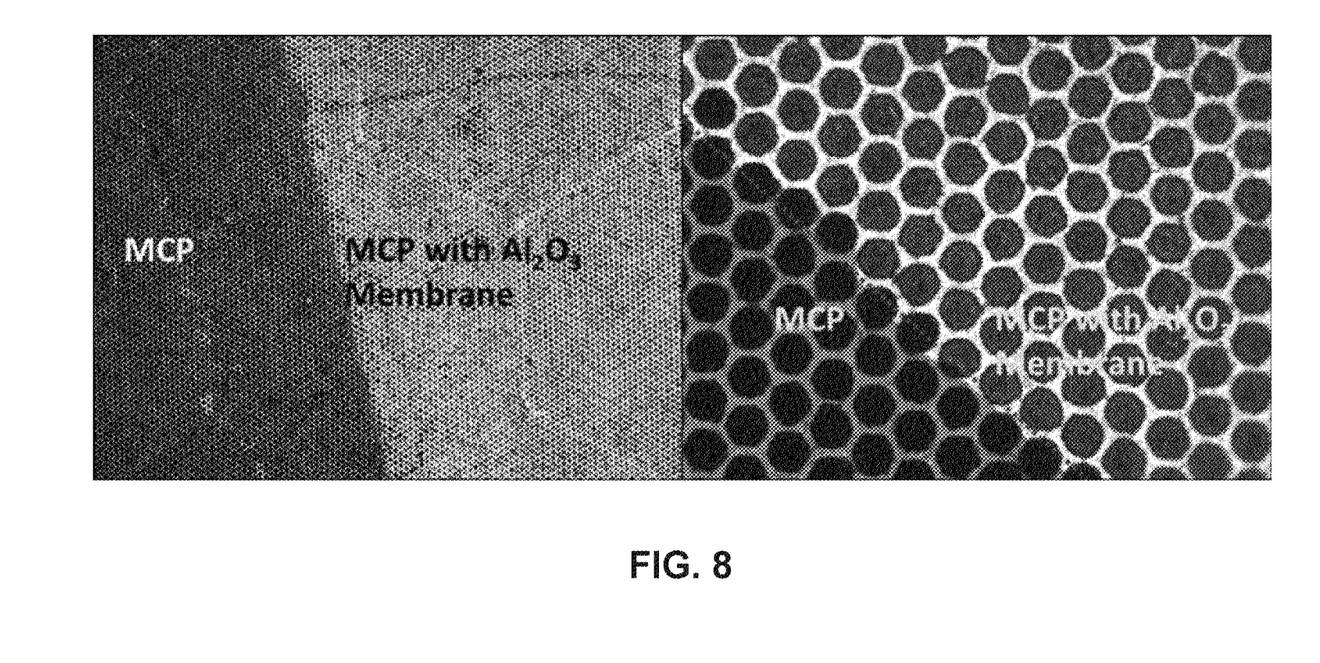
FIG. 8 illustrates an example of the enhanced electron amplifier structure of FIG. 2 including a microchannel plate (MCP) as a substrate and an $Al_2O_3$ layer as an enhancement layer. Although $Al_2O_3$ by itself is not a neutron sensitive layer, $Al_2O_3$ doped, for example, with neutron sensitive elements such as B, Li, Ga, Sm, Hf, Ta, Cd, Pb, or the like can be used as a neutron sensitive layer.

The method of fabricating the enhanced electron amplifier structure 100 includes a third step S3 of lifting the neutron sensitive layer 20 from the planar or structured/micro patterned etchable substrate 21 on which the neutron sensitive layer 20 was formed (see FIG. 7). Lifting the neutron sensitive layer 20 from the etchable substrate 21 includes dunking the etchable substrate 21 having the neutron sensitive layer 20 thereon into an etching solution and selectively lifting or separating the neutron sensitive layer 20 from the etchable substrate 21. The etching solution may be acidic or basic, depending on material solubility and compatibility. For example, acidic etching solutions that may be used include diluted hydrochloric acid (HCl) solution, $H_2SO_4$, $HNO_3$, HF, acetic acid or mixtures thereof. Basic etching solutions that may be used include NaOH, KOH and the like. Alternatively, the neutron sensitive layer 20 can be lifted or separated from the etchable substrate 21 by reactive ion etching or wet etching of the etchable substrate 21. The separated neutron sensitive layer 20 can be rinsed/cleaned. For example, the separated neutron sensitive layer 20 can be rinsed in a water bath at least one time to remove any remaining etching solution. The separated neutron sensitive layer 20 can be rinsed in a water bath multiple times.

In the third step S3, the $Ga_2O_3$ layer deposited on the Cu foil substrate with native CuO layer (i.e., the etchable substrate 21) may be dunked in diluted hydrochloric acid solution, where an etch rate of CuO (i.e., the sacrificial etch layer) is greater than the etch rate of the $Ga_2O_3$ layer. Thus, the CuO layer will be dissolved and the $Ga_2O_3$ layer will be lifted or separated, and subsequently float on the etching solution. This floating $Ga_2O_3$ layer (i.e., the neutron sensitive layer 20) can be rinsed/cleaned.

The method of fabricating the enhanced electron amplifier structure 100 includes a fourth step S4 of transferring the separated neutron sensitive layer 20 onto the substrate 10 (i.e., the electron amplifier structure). The integrity of the walls of the substrate 10 and the neutron sensitive layer 20 hold the neutron sensitive layer 20 in place and prevent the neutron sensitive layer 20 from collapsing within the channels. Due to nano size effects (size of pores), there is surface interaction between the substrate 10 surface and the thin neutron sensitive layer 20.

In order to transfer the separated neutron sensitive layer 20 onto the substrate 10, the substrate 10 is dipped in water and the separated neutron sensitive layer 20 is placed on the wet substrate 10. The substrate 10 and the neutron sensitive layer 20 are placed in an oven to dry, for example, at 200° C. for 1 hour, and remove any water trapped inside of the channels or pores of the substrate 10. The heating step assists in causing the neutron sensitive layer 20 to adhere to the substrate 10.

Although FIG. 5 refers to the step of providing the substrate 10 as the first step S1, one of ordinary skill in the art would have understood that the method of fabricating the enhanced electron amplifier structure is not limited in this regard. In some aspects, the step of providing the substrate 10 may be a later step performed, for example, between the steps S2 and S3 described above, or after the step S3 described above. While the steps of FIG. 5 can be reordered, the step S3 must come after the step S2, and the step S4 must come after the step S3.

The method of fabricating the enhanced electron amplifier structure 100 described above allows the low cost fabrication of enhancement layers having precise thickness and composition control. The resultant structure may provide better time and spatial resolution.

In general, neutron detection in electron amplifier devices follows the following mechanism: once a particular type of neutron (determined by the neutron energy) hits a neutron sensitivity material, the neutron interaction ejects electrons. These electrons are received in the electron amplification structure and get amplified in a cascade manner (i.e., secondary electron emissions). In the enhanced electron amplifier structure 100 including a neutron sensitive layer 20 formed on the electron amplifier structure or substrate 10, the sensitivity factor (neutron to electron conversion) can be controlled by adjusting the high nuclide density in the neutron sensitive layer 20. This can be achieved, for example, by adjusting the composition, thickness, microstructure, and/or mass/unit area of the neutron sensitive layer 20. Furthermore, neutron interaction with the electron amplification resulting from neutrons striking the neutron sensitive layer 20, which ejects electrons that are received in the electron amplification structure, can be adjusted using suitable geometry for the electron amplification structure. For example, when electron amplification structure or substrate 10 is an ALD functionalized MCP, this can be done fine-tuning the ALD resistive and SEE layer process parameters discussed in the examples related to fabricating the substrate 10 in the first step S1. Thus, according to the fabrication method described herein, large-area robust neutron detector with fine spatial resolution over large areas (e.g. neutron sensitive large area MCPs) can be produced, which facilitates the production of high efficiency, large-area neutron detectors. In addition, the electron amplifier structure to be adjusted for selectivity to various types of neutrons such as thermal neutrons, epithermal neutrons, cold neutrons, etc.

The enhancement layers for electron amplifier devices described above may be used in a variety of applications including, but not limited to membranes for electron amplifier structures, biotechnology (bio-sensors), tissue growth, bio medicine, image intensifier devices, photodetectors, medical imaging devices based on electron amplification methods, high speed cameras, x-ray detectors, mass spectrometers (e.g., time-of-flight mass spectrometry), secondary electron emission detectors, electron optics based microelectromechanical (MEMS) devices, etc.

The enhancement layers used for neutron detectors may be used in a variety of applications including, but not limited to homeland security (e.g., night vision devices), radiation safety, high energy physics or nuclear physics, and materials science. For example, the enhancement layers may be used for the following applications: detection of special nuclear material (U-233 and Pu-239 decay by spontaneous fission, yielding neutrons), nuclear reactor instrumentation (since reactor power is essentially linearly proportional to the neutron flux, neutron detectors provide an important measure of power in nuclear power and research reactors. Boiling water reactors may have dozens of neutron detectors, one per fuel assembly. Most neutron detectors used in thermal-spectrum nuclear reactors are optimized to detect thermal neutrons), radiation safety (neutron radiation is hazardous associated with neutron sources, space travel, accelerators and nuclear reactors. Neutron detectors used for radiation safety must take into account the relative biological effectiveness), particle and astrophysics (neutron detection is proposed as a method of enhancing neutrino detectors), materials science (elastic and inelastic neutron scattering enables experimentalists to characterize the morphology of materials from scales ranging from Angstroms to about one micron), and neutron imaging (enabling studies in biological systems, crystallographic structure, strain, phase, texture, and composition mapping, etc.).

The construction and arrangements of the methods of fabricating enhanced electron amplifier structures and the electron amplifier structures including an enhancement layer, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed is:

1. An enhanced electron amplifier structure comprising:
   a neutron sensitive layer having a predetermined neutron sensitivity, the neutron sensitive layer configured to interact with incident neutrons and subsequently, eject electrons due to the interaction;
   a microchannel substrate configured to amplify a signal of the ejected electrons by causing a cascade of secondary electron emissions; and
   an emissive coating provided on a surface of a microchannel in the microchannel substrate, the emissive coating configured to produce a secondary electron emission responsive to an interaction with an electron received by the microchannel,
   wherein the neutron sensitive layer is provided on an upper surface of the microchannel substrate and increases a sensitivity of the enhanced electron amplifier structure to the incident neutrons, and
   wherein the emissive coating is comprised of Li, Ga, Sm, Cd, Pb, or a sulfide.

2. A neutron detection system comprising:
   the enhanced electron amplifier structure of claim 1; and
   a detector configured to detect and count a number of the secondary electron emissions emitted by the substrate of the enhanced electron amplifier structure.

3. The enhanced electron amplifier structure of claim 1, wherein the neutron sensitive layer is comprised of
   B, Li, Ga, Sm, Hf, Ta, Cd, Pb or composites thereof, or $B_2O_3$, LiF, $Ga_2O_3$, $Gd_2O_3$, $Gd_xAl_{2-x}O_3$, $Gd_xMg_{1-x}O_y$, $B_xAl_{2-x}O_3$, $Sn_2O_3$, $HfO_2$, $Ta_2O_5$, BN, BC, $Li_3N$, or $Al_2O_3$ doped with B, Li, Ga, Sm, Hf, Ta, Cd, or Pb.

4. A method of fabricating an enhanced electron amplifier structure, the method comprising:
   forming a neutron sensitive layer on an etchable substrate, the neutron sensitive layer having a predetermined thickness and a predetermined neutron sensitivity, wherein the neutron sensitive layer is configured to interact with incident neutrons and subsequently, eject electrons due to the interaction;
   lifting the neutron sensitive layer from the etchable substrate;
   providing a substrate configured to amplify a signal of the electrons ejected by the neutron sensitive layer by causing a cascade of secondary electron emissions; and transferring the neutron sensitive layer onto an upper surface of the substrate.

5. The method of claim 4, wherein providing the substrate comprises fabricating the substrate according to the following steps:
providing a microchannel plate substrate, the microchannel plate substrate having a front surface and a rear surface and a plurality of channels extending through the substrate between the front surface and the rear surface;
coating the surfaces of the plurality of channels within the microchannel substrate with a resistive coating comprising a predetermined ratio of an insulating component and a conductive component composed of at least one of a metal, a metal nitride, and a metal sulfide; and
forming an emissive coating over the resistive coating, the emissive coating configured to produce a secondary electron emission responsive to an interaction with an electron received by one of the plurality of channels,
wherein the resistivity of the microchannel plate detector is defined by a ratio of the insulating component and the conductive component of the resistive coating.

6. The method of claim 4, wherein the neutron sensitive layer is formed on the etchable substrate using a chemical based thin film growth method or a physical vapor deposition method.

7. The method of claim 6, wherein the chemical based thin film growth method comprises ALD, CVD, VPE, Sol gel, or spray pyrolysis.

8. The method of claim 6, wherein the physical vapor deposition method comprises thermal evaporation MBE, sputtering, or 3D printing.

9. The method of claim 4, wherein lifting the neutron sensitive layer from the etchable substrate comprises dunking the etchable substrate having the neutron sensitive layer formed thereon into an etching solution that selectively etches the etchable substrate to separate the neutron sensitive layer from the etchable substrate.

10. The method of claim 9, further comprising rinsing the separated neutron sensitive layer with water prior to transferring the neutron sensitive layer onto the substrate.

11. The method of claim 9, wherein transferring the neutron sensitive layer onto the substrate comprises
wetting at least the upper surface of the substrate with water;
placing the neutron sensitive layer onto the upper surface of the water; and
heating the substrate having the neutron sensitive layer placed thereon to remove the water.

12. The method of claim 9, wherein the neutron sensitive layer is comprised of $Ga_2O_3$.

13. The method of claim 9, wherein the etchable substrate is comprised of a Cu foil substrate with native CuO layer.

14. The method of claim 9, wherein the etching solution is comprised of diluted hydrochloric acid solution.

15. The method of claim 9,
wherein the neutron sensitive layer is comprised of $Ga_2O_3$,
wherein the etchable substrate is comprised of a Cu foil substrate with native CuO layer, and
wherein the etching solution is comprised of diluted hydrochloric acid solution.

16. The method of claim 4, wherein the neutron sensitive layer is comprised of
B, Li, Ga, Sm, Hf, Ta, Cd, Pb or composites thereof, or $B_2O_3$, LiF, $Ga_2O_3$, $Gd_2O_3$, $Gd_xAl_{2-x}O_3$, $Gd_xMg_{1-x}O_y$, $B_xAl_{2-x}O_3$, $Sn_2O_3$, $HfO_2$, $Ta_2O_5$, BN, BC, $Li_3N$, or $Al_2O_3$ doped with B, Li, Ga, Sm, Hf, Ta, Cd, or Pb.

* * * * *